United States Patent [19]
Ellersick

[11] Patent Number: 4,630,594
[45] Date of Patent: Dec. 23, 1986

[54] FURNACE WALL LINING COMPOSITION AND THE USE THEREOF

[76] Inventor: Russell R. Ellersick, 600 Commerce Dr., Suite A, Roseville, Calif. 95678

[21] Appl. No.: 698,613

[22] Filed: Feb. 6, 1985

Related U.S. Application Data

[63] Continuation-in-part of Ser. No. 473,759, Mar. 9, 1983, abandoned.

[51] Int. Cl.[4] .............................................. F24C 15/08
[52] U.S. Cl. ................................... 126/64; 106/38.27; 501/95; 264/30; 266/280; 110/323
[58] Field of Search ................... 126/128, 64; 110/323, 110/322; 501/95, 133; 264/30; 266/280; 106/38.27, 286

[56] References Cited

U.S. PATENT DOCUMENTS

| | | | |
|---|---|---|---|
| 3,248,251 | 4/1966 | Allen | 106/286 |
| 3,629,116 | 12/1971 | Gartner | 501/95 |
| 3,754,948 | 8/1973 | Ash | 501/95 |
| 4,037,015 | 7/1977 | Koike et al. | 106/38.27 |
| 4,071,368 | 1/1978 | Jones | 106/38.27 |
| 4,174,331 | 11/1979 | Myles | 264/30 |
| 4,442,219 | 4/1984 | TenEyck et al. | 264/30 |

*Primary Examiner*—Randall L. Green
*Assistant Examiner*—Noah Kamen
*Attorney, Agent, or Firm*—Mark C. Jacobs

[57] ABSTRACT

An infrared ray reflective coating for application to insulative materials comprising aluminum particles in an aqueous acidic binder slurry, a hardener, and a coating cement having about 96% of a mixture of $Al_2O_3$ and $SiO_2$.

7 Claims, 7 Drawing Figures

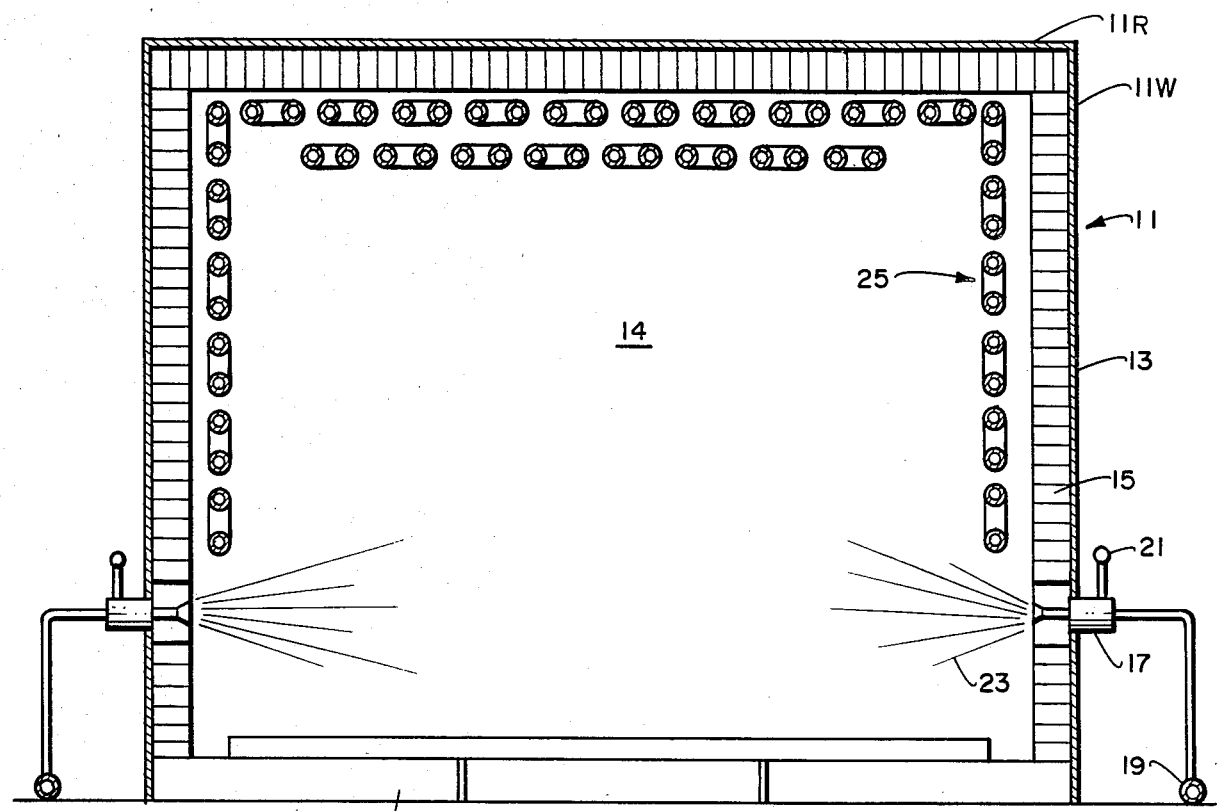
Fig. 1. PRIOR ART
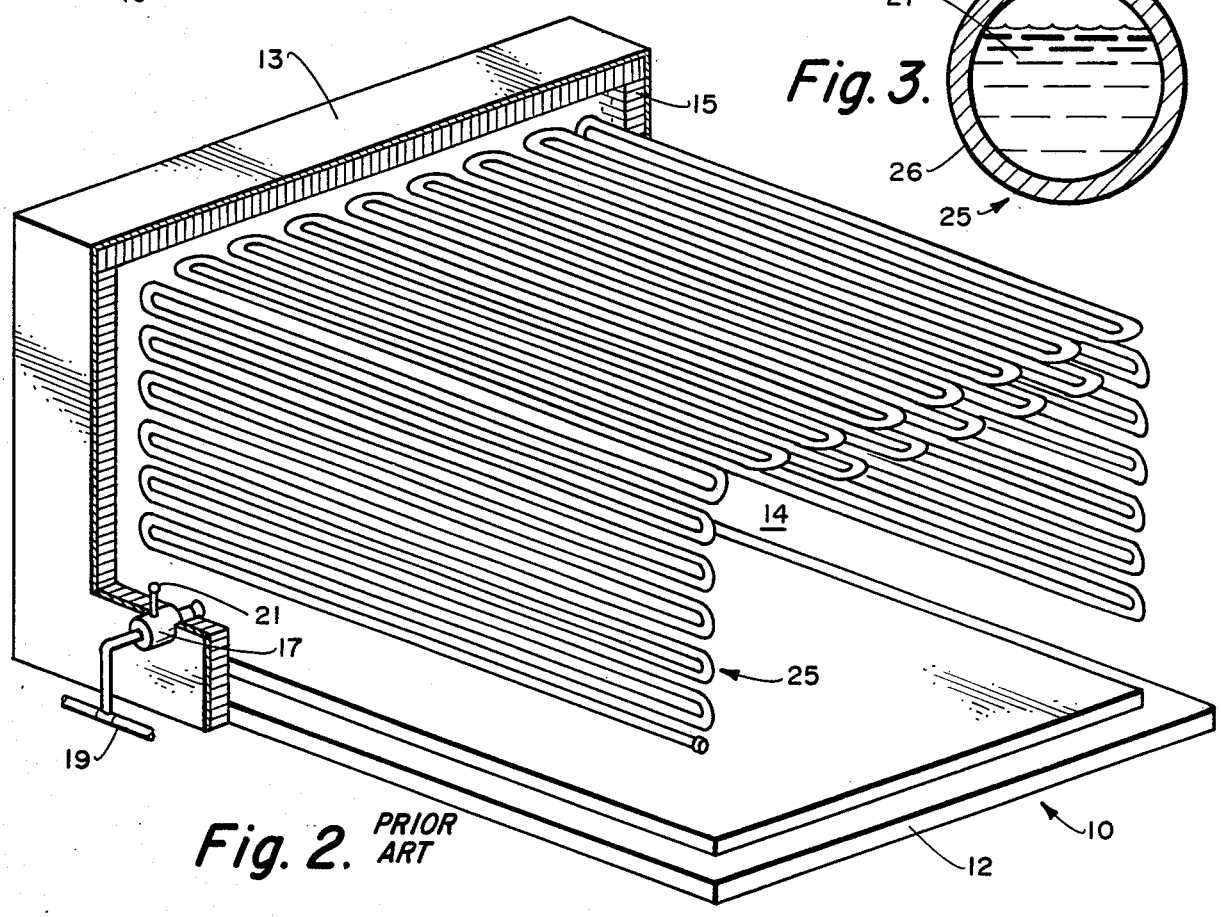
Fig. 2. PRIOR ART
Fig. 3.

FURNACE WALL LINING COMPOSITION AND THE USE THEREOF

PRIOR APPLICATIONS

This application is a continuation in part of Ser. No. 473,759 filed Mar. 9, 1983, now abandoned.

BACKGROUND OF THE INVENTION

In these days of high costs even the energy companies have a need for reducing their energy costs that arise in the production of their products.

Thus petrochemical companies and other companies that use high heat furances that operate at over 1000° F. are desirous of lowering operating costs. The furnaces involved use natural gas or heating oil to heat the inside of a furnace whereby tubes along the interior of the walls and roof of such furnaces are indirectly heated and in turn fluids therein are heated.

Such fluids, which in the case of water is turned into super heated steam, and which in the case of chemical reactents react to form new compounds or compositions within the tubes of the furnace.

When one understands that a San Francisco Bay area petrochemical plant has a monthly energy bill for gas and electricity in the neighborhood of $7 million per month, the need for means for improving operating efficiency is readily recognized.

It is an object therefore to provide a liner for the firebricks of a furnace that will reduce energy consumption by the furnace.

It is another object to provide a liner for furnaces that increases the efficiency of furnaces.

Yet another object is to provide a material that is easily applied to the firebrick of furnaces to speed up the operation of the furnace.

Still another object is to provide a process for applying such liner composition.

A further object is to provide a composition that is non-toxic and non-detrimental to the operation of the furnace.

A yet further object is to provide a composition that reduces the cost of production of products made in high temperature furnaces.

These and other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference is made to the following figures wherein like numbers refer to like parts.

BRIEF DESCRIPTION OF THE DRAWINGS

FIG. 1 is a vertical cross-sectional view of a typical gas fired furnace.

FIG. 2 is a perspective view with the roof and one side wall removed to show the interior of such a furnace.

FIG. 3 is a closeup cross-section of a single pipe used in such furnaces.

SUMMARY OF THE INVENTION

Figure 4:
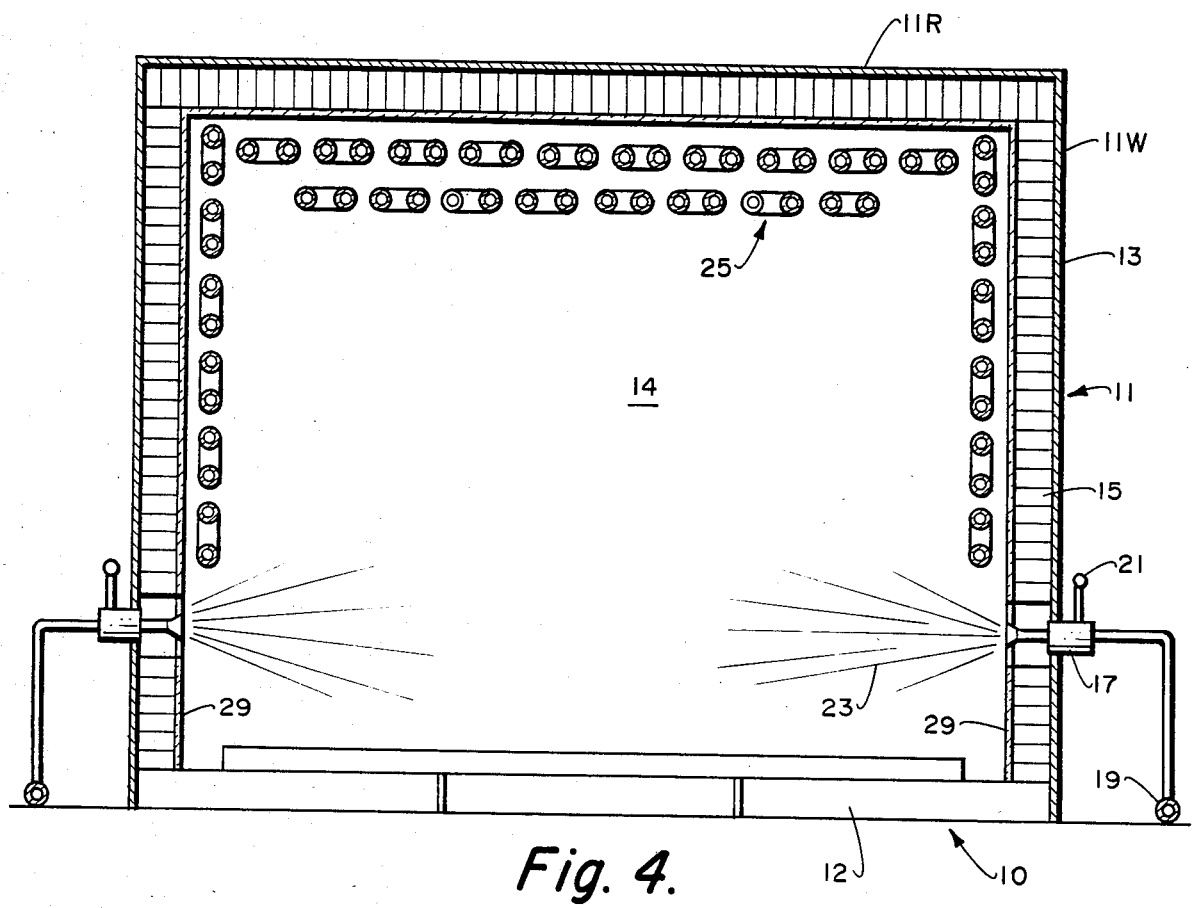
FIG. 4 is a figure similar to FIG. 1 but having the coating of this invention applied to its proper location.

The compensation of this invention and the process for utilizing same comprises preparing an intimate mixture of a firebrick, liner which comprises a ceramic fiber, a hardener and an inorganic coating formula which latter constitutes an inorganic binder and aluminum.

DESCRIPTION OF THE PREFERRED EMBODIMENT

Process furnaces utilize gas or oil as the fuel to achieve high heat. Reference is made to FIG. 1 hereof. In these furnaces, such as the one depicted in FIG. 1, and designated 10, the furnace 10 comprises a generally rectangular building or room having upstanding side walls 11W and roof 11R. All of these include an outer heat resistant coating 13 and a firebrick layer 15. While shown only one brick thick for simplicity the actual insulating material thickness could include two (2) or more bricks. The furnace 10 includes a conventional floor structure 12 adapted to seal off the chamber to yield a heat zone or interior 14. Pipes 25 are conventionally mounted with temperature resistant brackets not shown. Heat generated from the furnaces 17 employ gas from feed lines 19 and the flame is controlled by control arm 21. The flames are depicted as 23. Insulating blankets or batts may also be employed as the liner and are discussed in connection with FIGS. 6 and 7.

As chamber 14 (the heat zone) heats up, heat is transferred to pipes 25 thereby heating the contents of the pipes.

Such furnaces are well known to the art and have been used by petrochemical companies and others for chemical manufacturing processes. Reference is made to FIG. 3 which is a closeup sectional view through a typical pipe. This pipe 25 has a wall 26 and liquid(s) 27 flowing therein which are subjected to the heat of the furnace.

Many different approaches to the problem of achieving increased efficiency for these furnaces have been tried, often to no avail. Usually the approach has been to utilize fuel additives to change the burning rate, or to attempt to influence the nature of the flame in some fashion.

Applicant has taken a totally new approach. Applicant herein is first to hit upon the fact that the spectrum of the flame of these processing furnace is in the infrared band, and that by increasing the light reflectance of the furnace interior more of the infrared wavelengths can be reflected back into chamber 14 toward pipes 25, rather than being absorbed into the firebrick 15 as occurs in the normal course of events.

Applicant determined that if infrared reflective coating is applied to the firebrick, light rays from the flame will be reflected inwardly rather than being absorbed into the walls. Since these infrared rays are heat bearing, the efficiency of the furnace will be increased.

Applicant then created the fiber brick liner composition of this invention, and the method of utilizing same.

FIG. 2 shows the interior os such a furnace while FIGS. 1 and 4 show the furnace minus the end walls which are similar to upright walls 11W. For the sake of clarity, the firebrick is shown in FIG. 2 but most of same has been removed from the tube area. The lining of the instant composition is shown in FIG. 4 and designated 29. The lining is shown in closeup in FIG. 5 as applied over the firebrick 15.

Once having recognized the idea that furnace efficiency could be increased by lining the firebrick with a light reflective coating that would not be consumed by the heat present in the furnace, applicant set out to prepare such coatings.

The coatings of this invention utilize two main ingredients; first being an aqueous inorganic chromate-phosphate binder to which aluminum particles are added, and the second ingredient is a coating cement.

The binder composition, preferably in the format of slurry, may be made in accordance with the teachings of U.S. Pat. No. 3,248,251 particularly at column 8 line 45 et seq. To this binder is added dispersed aluminum particles to yield the binder composition.

Binder compositions as described above are manufactured by Teleflex Incorporated of North Wales, Pa., the assignee of the cited U.S. Pat. No. 3,248,251, and sold under the trademark SermeTel W. Reference is also made to Standard Pressed Steel Company Report No. 1990, dated Dec. 15, 1970 which discusses using Serme-Tel W as a coating for Aerospace Fasteners, which report is incorporated herein, with specific reference to page 21 and page iii.

The second component is a Fiberfrax coating cement, selected from Fiberfrax QF150 and QF180.

The Fiberfrax coating cements are mildly alkaline and not soluble in water. This component is available in paste and paint consistencies respectively from the Insulation Division of the Carborundum Company, Niagara Falls, N.Y.

The typical dry chemical composition of each of these is as follows:

|  | QF150 | QF180 |
| --- | --- | --- |
| $Al_2O_3$ | 38.6% | 37.2% |
| $SiO_2$ | 57.5 | 59.1 |
| $Na_2O$ | 0.7 | 0.7 |
| MgO | 0.3 | 0.3 |
| $Fe_2O_3$ | 0.7 | 0.7 |
| $TiO_2$ | 1.5 | 1.4 |
| Trace inorganics | 0.6 | 0.6 |

These dry components of ball milled fibers are blended with inorganic additives.

The third component is a hardener which is blended with the first two components to yield the final composition to be applied to the firebrick. The hardener constitutes Kaowool ® Rigidizer, or a colloidal silica used primarily for treating ceramic fibers to provide some surface hardness. It is an off white product having a density of 75 lb/cu ft and having a silica content of approximately 28% and a pH of 9.7. It is available in the marketplace from Babcock and Wilcox, Insulating Products Division of Augusta, Ga. This specific product contains about 29% silica, 69% $H_2O$ and 2% Ethylene Glycol. It is seen that any substantially equal aqueous suspension of amorphrous silica can be utilized as the hardener component with equally good results. The three component compositions of this invention can vary in content as shown in the following table.

| Hardener | 1% to 5% |
| --- | --- |
| SermeTel | 1% to 50% |
| Fibrefrax | 50% to 90% |
| Total Composition 100% | |

Figure 6:
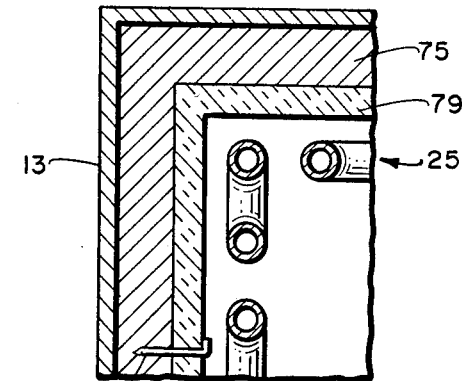
FIG. 6 is a closeup view showing the coating of this application applied to an insulative wool furnace liner.
Figure 7:
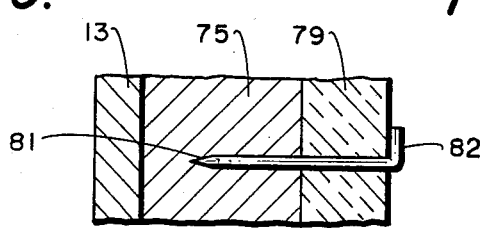
FIG. 7 is a super closeup view of the portion of FIG. 6 shown in the circle.

Turning now to FIGS. 6 and 7 it is seen that the composition of this invention has equal utility in furnaces having steel or other metal walls designated 75 upon which are overlaid blankets (rolls) or batts of a wool like ceramic fiber material. One product suitable for such purposes is Kaowool ® sold by Balcock and Wilcox. The insulative wool is generally available in batts or in roll form about two (2) feet wide and two (2) inches thick. It, 79, is superposed in front of the metal wall by applying a tabbed metal stud 81 through the batt and into the wall using a Nelson or other suitable stud gun known to the art. The tab portion 82 is then manually raised upwardly to prevent the batt from being readily removed from its placement in front of the metal wall 75. Reference is made specifically to FIG. 7 which is a super closeup view of the circle portion of FIG. 6.

PREPARATION AND USE OF LINING COMPOSITION

In a typical liner composition two (2) parts of Serme-Tel W are mixed with fifty (50) parts of Fibrefrax and stirred to form a homogeneous composition. To this mix is further added the hardener in about one (1) part. All parts are based on percentage by weight. The mixture is now ready for use.

Before applying the liner composition, the furnace is cooled down to ambient temperature to permit entry therein. The firebrick is optionally cleaned to remove any undesirables on the surface of the brick. The brick may be abraded slightly as by rubbing surface until a fine grit to improve holding capability of the coating. The surface of the firebrick is then dusted to remove the grit. The liner composition which is in the form of a viscous paint is applied as by brushing, spraying or otherwise applying, and allowed to air dry and harden. The coating lay will bite or bind readily to the material. The lining composition is applied as a coating of between 30 and 160 microns thick to achieve satisfactory results.

If the insulative material is a wool blanket or batt, no preparation need be considered prior to application as by spraying of the liner composition of this invention.

It has been found that an application of the coating of this invention will increase light reflectance of the insulating material by about 100%. This translates to an increase of furnace efficiency of about 5% thereby resulting in decreased fuel consumption.

Figure 5:
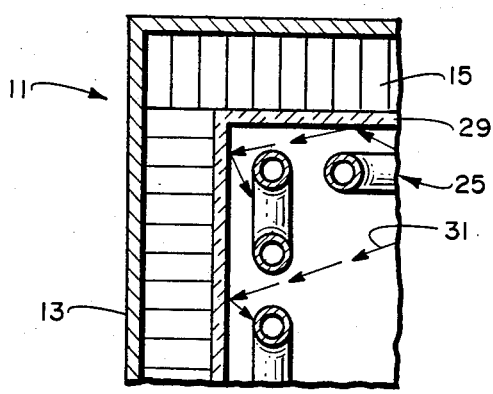
FIG. 5 is a closeup view showing the coating of this invention applied over firebricks of the furnace herein.

Reference is made to FIG. 5 wherein arrows 31 are seen to represent light rays that instead of directly impinging upon tubes 25, impinge upon the reflectively coated, insulative material which is FIG. 5 is firebrick. It is of course understood that other light rays not seen impinge on tubes 25. But it is the normally recited, now reflected rays 31 which will heat up the tubes instead of being absorbed by the firebrick if they were uncoated.

Applicant can, by application of the instant compositions increase the energy efficiency of chemical processing furnaces by inhibiting infrared (hot) radiation arising from the burning of natural gas and other fuels from penetrating into the firebrick of these furnaces for dissipation. Rather, the infrared rays are reflected back into the work area of the interior of the furnace, thereby creating a cost savings due to lower fuel requirements.

In one furnace where catalyst for the manufacture of gasoline is produced, and the fuel bill to operate the furnace can run $100,000 per month for natural gas, a conservative saving of 8 to 10% of fuel costs was achieved.

Since certain changes may be made in the above apparatus without departing form the scope of the invention herein involved, it is intended that all matter contained in the above description and shown in the accompanying drawings shall be interpreted as illustrative and not in a limiting sense.

I claim:

1. An improved natural gas or heating oil fired furnace which furnace has tubes therein for the formation of super heated steam or for the carrying out of chemical reactions, and which furnace further comprises a chamber lined with an insulative material, the improvement comprising: a combination of said insulative material, and an infrared ray reflecting composition thereupon, said reflecting composition adapted to impede penetration of infrared rays through said insulative material, said composition comprising:
   1 to 50% of an aqueous slurry having an acidic pH of a chromate-phosphate binder and dispersed aluminum particles,
   50 to 90% of a coating cement comprised of
      about 38% of $Al_2O_3$
      about 58% $SiO_2$
      about 0.7% $Na_2O$
      about 0.3% MgO
      about 0.7% $Fe_2O_3$
      about 1.5% $TiO_2$
      an trace organics about 0.6%
   1 to 5% of a suspended amorphous silica hardener the total being 100%.

2. The improved furnace of claim 1 wherein the furnace insulation lined with the coating composition is firebrick.

3. The improved furnace of claim 1 wherein the furnace insulation lined with the coating composition is an insulative wool.

4. The process for improving the efficiency of a gas or a burner fired chemical processing furnace which furnace has insulation on the inside thereof, which comprises applying a thermally stable infrared ray reflective coating to the exterior surface of the insulation within said furnace, said coating comprising,
   1 to 50% of an aqueous slurry having an acidic pH of a chromate-phosphate binder and dispersed aluminum particles,
   50 to 90% of a coating cement comprised of
      about 38% of $Al_2O_3$
      about 58% $SiO_2$
      about 0.7% $Na_2O$
      about 0.3% MgO
      about 0.7% $Fe_2O_3$
      about 1.5% $TiO_2$
      an trace organics about 0.6%
   1 to 5% of a suspended amorphous silica hardener the total being 100%, and allowing the coating to air dry.

5. The process of claim 4 wherein the step of applying the liner composition comprises spraying the composition on the insulative material.

6. The process of claim 4 wherein the step of applying the liner composition comprises brushing the composition of the insulative material.

7. An ambient temperature dryable coating composition for reflecting infrared light from insulative materials when applied as by spraying or brushing thereupon which comprises:
   1 to 50% of an aqueous slurry having an acidic pH of a chromate-phosphate binder and dispersed aluminum particles,
   50 to 90% of a coating cement comprised of
      about 38% of $Al_2O_3$
      about 58% $SiO_2$
      about 0.7% $Na_2O$
      about 0.3% MgO
      about 0.7% $Fe_2O_3$
      about 1.5% $TiO_2$
      an trace organics about 0.6%
   1 to 5% of a suspended amorphous silica hardener the total being 100%.

* * * * *